Jan. 9, 1968  J. E. REINHART  3,362,668
SURFACE GAGE
Filed Nov. 9, 1966  2 Sheets-Sheet 1
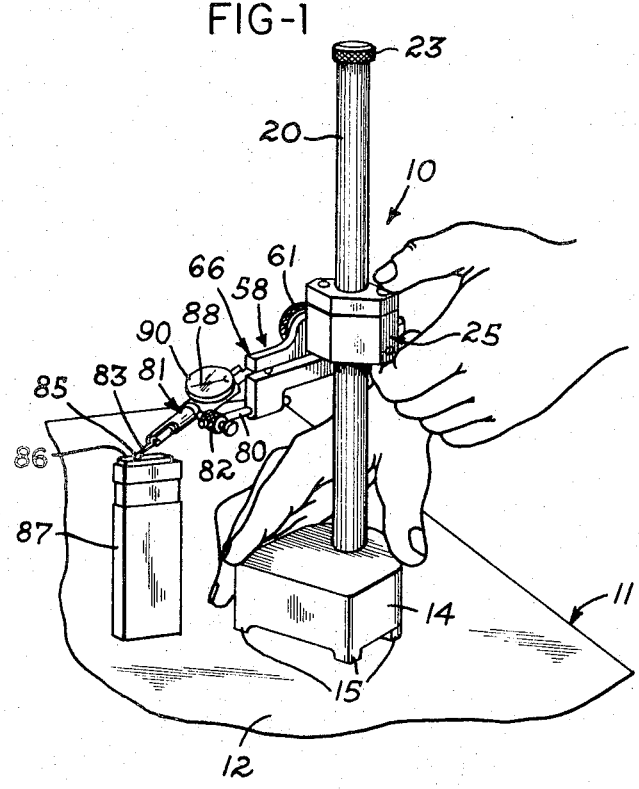
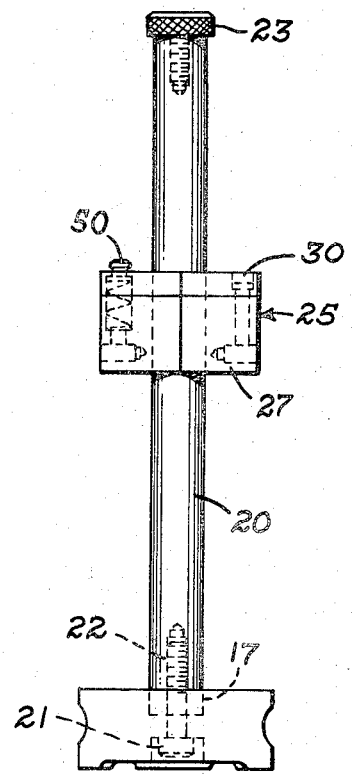
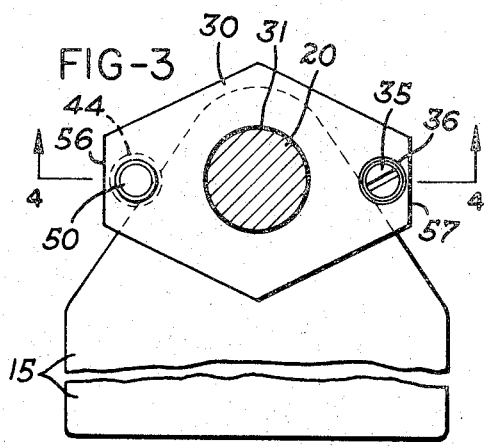
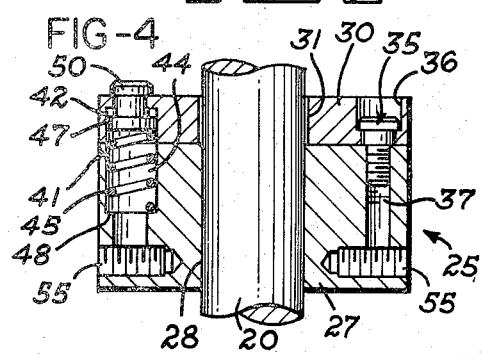
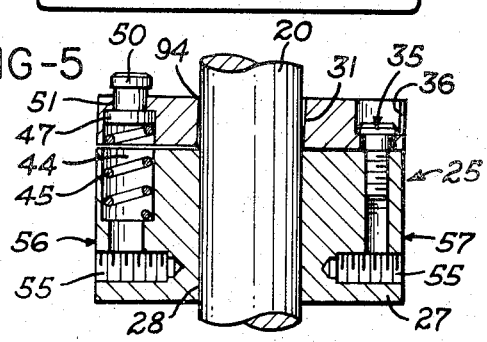
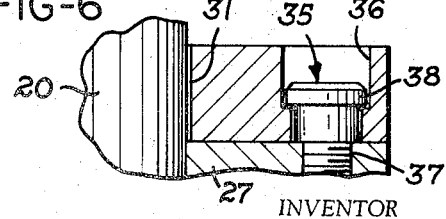
INVENTOR
JOSEPH E. REINHART
Marechal, Biebel, French & Bugg
ATTORNEYS Jan. 9, 1968 J. E. REINHART 3,362,668
SURFACE GAGE
Filed Nov. 9, 1966 2 Sheets-Sheet 2
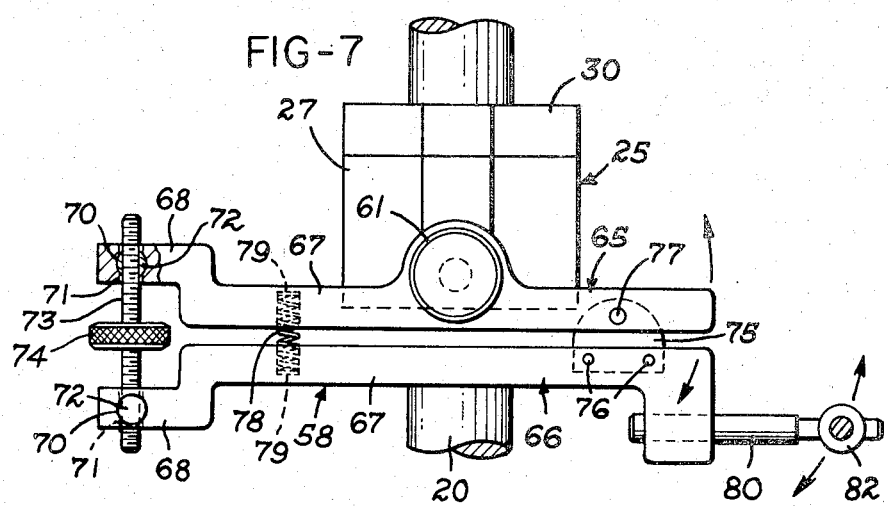
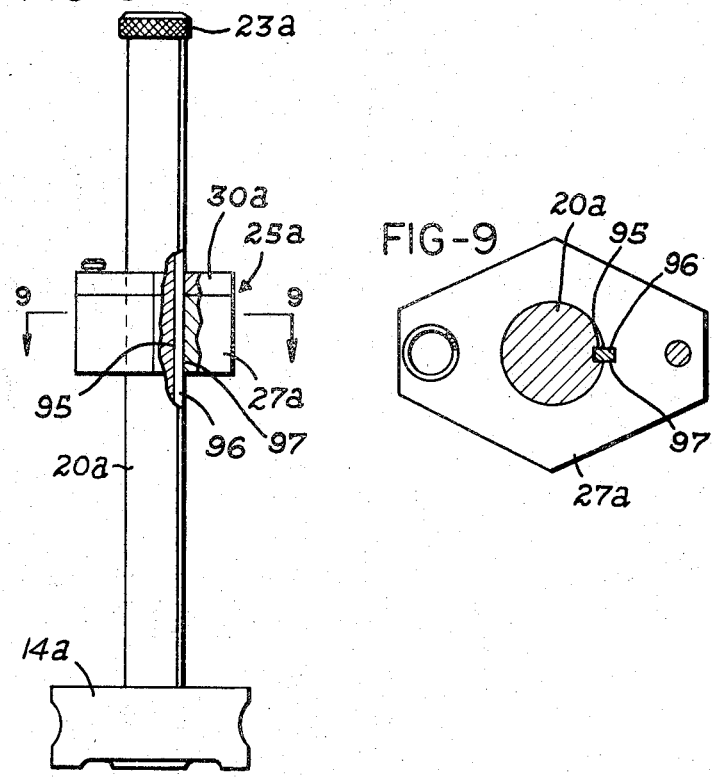

United States Patent Office 3,362,668
Patented Jan. 9, 1968

3,362,668
SURFACE GAGE
Joseph E. Reinhart, West Carrollton, Ohio, assignor of one-half to Robert R. Beard, Dayton, Ohio
Filed Nov. 9, 1966, Ser. No. 593,129
7 Claims. (Cl. 248—125)

This invention relates to a measuring device, and particularly to a comparative type surface gage which is operated manually.

In the tool and die industry as well as in other areas of industry there is considerable measuring and testing which must be done to determine that the dimensions of the various components of a piece of machinery are precisely accurate. Frequently, it is necessary to determine whether a surface of one end of an elongated block is flat. The dimensions are checked by placing the workpiece on a test table having a flat surface thereon and utilizing a test gage including a stand having a movable slide thereon with a dial gage secured thereto. The probe of the dial gage is brought into contact with the surface and the probe moved across this surface with the dial gage indicating variations in dimension thus indicating whether the workpiece is within the necessary tolerances.

Accordingly, an important object of this invention is to provide an improved surface gage which includes a slide which is easily and quickly adjusted to the desired height above the work table or other surface.

Another object of this invention is to provide a self-locking slide for an indicator gage of the aforesaid type wherein the slide can be moved vertically by merely pressing a button releasing the slide from locking engagement with the vertical support, and further to provide a slide which automatically locks in place when the aforesaid button is released.

A further object of this invention is to provide an indicator gage of the aforesaid type which is faster and easier to use, requires less physical effort on the part of the operator, and which is simple in design and operation for reduced costs and increased dependability.

Further objects and advantages of the invention will be apparent from the following description, the accompanying drawings and the appended claims.

In the drawings:

FIG. 1 is a perspective view of the surface gage in accordance with the invention;

FIG. 2 is an elevation view of the surface gage;

FIG. 3 is a plan view of the surface gage;

FIG. 4 is a sectional view taken along the line 4—4 of FIG. 3;

FIG. 5 is a view similar to FIG. 4 but showing the slide in its locked position;

FIG. 6 is an enlarged fragmentary sectional view showing the manner in which the slide pivots to permit the locking operation;

FIG. 7 is a side elevation view of the mounting bracket;

FIG. 8 is an elevation view partially broken away of another embodiment of the invention; and FIG. 9 is a sectional view taken along the line 9—9 of FIG. 8.

Referring now to the drawings wherein a preferred embodiment of the invention is shown, the surface gage 10 is mounted on a work table 11 which has a flat top surface 12 and is usually made of metal. The gage 10 includes a base 14 having at least three feet 15 extending downwardly therefrom and engaging the surface 12 of the work table. The base is relatively short and has a vertical bore 17 (FIG. 2) therein for receiving the vertical support shaft 20. The shaft 20 is secured in the bore 17 by the socket head screw 21 which is received in the threaded bore 22 in the shaft 20 and secures the shaft to the shoulder.

The shaft 20 extends vertically and has a knurled cap screw 23 on the top end thereof and the slide 25 mounted thereon and adapted to move between the base and the head, as will be described. The slide 25 includes a lower section 27 having a central bore 28 (FIG. 4) therethrough only slightly larger than the diameter of the shaft so that this section slides smoothly on the shaft. The slide also includes an upper section 30 which similarly has a bore 31 therethrough which is slightly larger than the diameter of the shaft 20 so that this section can be canted slightly to lock itself to the shaft, as will be seen.

The lower and upper sections 27 and 30 are interconnected by a locking screw 35 which extends through the counterbore 36 in the right-hand side of the upper section 30 and is threadedly received within the complementary bore 37 in the lower section 27, as shown in FIG. 4. The bore 36 is slightly larger than the adjacent head portions 38 of the screw to permit slight amount of pivotal movement of the upper section with respect to the lower section.

In the left-hand side of the lower and upper sections 27 and 30 the aligned internal bores 41 and 42 are formed to define a spring chamber 44. A coil spring 45 is inserted into this chamber to urge the sections apart by engagement with the piston 47 in the upper section 30 and the shoulder 48 in the lower section 27 causing the two sections to be continually forced apart. An actuator is provided in the upper section and includes an actuator head or button 50 mounted for reciprocation in the bore 51 to move the piston 47 to compress the spring 45.

The horizontal threaded bores 55 are provided in the opposite sides 56 and 57 of the lower section 27 for securing the gage mounting bracket 58 in place, as shown in FIG. 1. This bracket includes a knurled wheel 61 which extends through the bracket member 58 to secure the bracket to the lower section 27 of the slide 25.

The mounting bracket 58 is shown in FIG. 7 and includes an upper member 65 which is secured to the lower section 27 of the slide by the wheel 61. The bracket 58 can be easily removed and secured in the threaded bore 55 on the other side of the slide 25. The lower member 66 of the mounting bracket is substantially identical to the upper member 65 except that it is reversed and each has the longitudinal central sections 67 with the projecting ears 68 on the left-hand end thereof. Horizontal and vertical bores 70 and 71 are provided in each of the ears 68. The bore 70 receives the cylindrical member 72 having the tapped hole therein which in turn receives the complementary threaded adjustment member 73 which has the knurled turning wheel 74 secured in center thereof. The direction of the threads on the member 73 is such that turning the wheel 74 will cause the ears 68 to be pulled together or forced apart depending upon the direction of travel.

The two members 65 and 66 are secured together by the plate 75 which is secured to the lower member by the fastening members 76 and is pivotally connected to the upper member 65 by the pin 77. A coil spring 78 is also disposed between the two members in the aligned bores 79 in such a manner that the members 65 and 66 are continually urged apart.

The bracket 66 has a horizontal extending shaft 80 which mounts the dial gage 81 on the end thereof. This dial gage is conventional in design and includes the support 82 secured to the body of the gage. A probe 83 extends axially from the gage and the tip 85 thereof is adapted to contact the top surface 86 of a workpiece 87 while the pointer 88 on the rotary dial 90 indicates movement of the probe.

In operation, when the flatness of the top surface 86 of the workpiece 87 is to be checked, the workpiece is placed on the flat top surface 12 of the table 11 together with the gage 10. The base 14 is moved across the surface by hand into close proximity with the workpiece. The slide 25 is then adjusted vertically on the vertical shaft 20 to position the tip 85 of the probe 83 in contact with the surface to be checked. The slide is adjusted by placing the index finger beneath the lower section 27 of the slide 25, as shown in FIG. 1, with the thumb engaging the actuator 50 so that a slight amount of pressure is applied to compress the spring 45 and move the left-hand portions of the upper and lower sections 30 and 27 together, as shown in FIG. 4, thereby allowing the slide to move vertically on the shaft 20.

When the slide 25 is moved to the desired position, the pressure on the actuator 50 is released and the spring 45 forces the upper section 30 away from the lower section 27, as shown in FIG. 5. Because the bore 31 in the upper section 30 is slightly larger than the diameter of the shaft 20, the upper section 30 is wedged to the shaft with the edge 94 (FIG. 5) of this bore engaging the shaft to lock the upper section, and thus the entire slide 25, in place until the actuator 50 is again depressed. Thus the operator can quickly and efficiently move the slide vertically to a position wherein the tip 85 is in the desired position, as opposed to the time consuming method of using a screw adjustment as heretofore practiced in the art.

When making fine adjustments the wheel 74 is rotated to move the lower member 66 about the pin 77 to thus raise or lower indicator arm 80. When the tip 85 is properly positioned, the base 14 is manually moved on the table to move the probe 83 to the various areas of the surface 86. If this surface is not flat the pointer 88 rotates to indicate to the operator the precise deviation of the surface 86.

Referring now to FIGS. 8 and 9, another embodiment of the invention is shown wherein the vertical shaft 20a has a vertical key slot 95 therein for receiving the rectangular key 96 in the manner shown in FIG. 9. The key slot 95 extends the entire length of the shaft 20a between the cap 23a and the base 14a, and the lower and upper sections 27a and 30a have complementary slots 97 formed therein to accommodate this key while providing for sliding movement in a vertical direction. The key thus prohibits the slide 25a from being rotated on the shaft 20a thus keeping the feeler gage moving in a vertical plane during adjustment. While the key 96 is shown as being formed separate from the shaft 20a, it is within the scope of the invention to form it integrally with the shaft.

The invention has thus provided an improved surface gage which can be quickly adjusted with a consequent saving of a substantial amount of the operator's time so that many workpieces can be checked. The slide moves easily on the shaft 20 by merely applying pressure to the actuator, but at the same time, the slide automatically is locked to the shaft by merely releasing such pressure. Because of the simplicity of the device it is both comparatively inexpensive and dependable in operation.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:
1. A surface gage support comprising a base adapted to be placed on a flat reference surface, a vertical shaft on said base, a slide member supported on the shaft and adapted to support a gage device, said slide member having a first section having a first vertical opening therethrough for receiving the shaft, said first opening having a size and configuration sufficient to provide for easy movement of said first section on said shaft, a second section secured to said first section and having a second vertical opening therethrough aligned with said first opening and having a size and configuration slightly larger than said shaft so that said second section will cant on said shaft to lock said slide member to said shaft, pivot means securing said sections together at a point spaced from one side of said shaft, spring means biasing said sections apart on the side thereof opposite said one side to cause said second section to cant and lock said slide member to said shaft, and manually operated actuator means for compressing said spring means and moving said second section from its canted position to release said slide member from the shaft so that said slide member can be quickly and easily moved to another position on said shaft.

2. A surface gage support as defined in claim 1 wherein said pivot means is a screw which extends vertically through complementary bores in each of said sections and is spaced from said shaft on one side of said slide member, the connection between said screw and one of said sections being such as to provide for said pivotal movement.

3. A surface gage support as defined in claim 1 wherein said spring means is a coil spring disposed in a vertical chamber formed by complementary bores in each of said sections on the side thereof opposite said one side.

4. A surface gage support as defined in claim 1 wherein said first section is a lower section and said second section is disposed above said lower section, said lower section having an axial height greater than said upper section to prohibit said lower section becoming canted on said shaft.

5. A surface gage support as defined in claim 1 wherein a longitudinally extending key means is provided in said shaft, and means defining a key slot in said slide member to receive said key means to prevent relative rotation between said shaft and said slide member.

6. A surface gage support as defined in claim 1 wherein fine adjustment means are provided on said slide member for effecting small adjustments in the position of a gage device.

7. A surface gage support as defined in claim 6 wherein said adjustment means includes a pair of longitudinal members pivotally secured together at one end and having adjustable means for interconnecting the opposite ends thereof, spring means for urging said opposite ends apart, means securing one of said members to said slide member, and means for securing a gage device to the other of said members.

References Cited

UNITED STATES PATENTS

| 1,384,351 | 7/1921 | Sather | 248—125 |
| 2,637,313 | 5/1953 | White | 248—125 XR |
| 2,846,171 | 8/1958 | Kronhaus | 248—410 |

FOREIGN PATENTS

| 453,684 | 9/1936 | Great Britain. |
| 356,881 | 10/1961 | Switzerland. |

JOHN PETO, *Primary Examiner.*